United States Patent
Jin et al.

(10) Patent No.: US 8,940,453 B2
(45) Date of Patent: Jan. 27, 2015

(54) ELECTRODE CATALYST FOR FUEL CELL, METHOD OF MANUFACTURING THE SAME, AND FUEL CELL USING THE ELECTRODE CATALYST

(75) Inventors: Seon-ah Jin, Pocheon-si (KR); Chan-ho Pak, Seoul (KR); Kyung-jung Kwon, Yongin-si (KR); Kang-hee Lee, Suwon-si (KR); Dae-jong Yoo, Seoul (KR); Jong-won Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 547 days.

(21) Appl. No.: 12/964,203

(22) Filed: Dec. 9, 2010

(65) Prior Publication Data

US 2011/0151354 A1 Jun. 23, 2011

(30) Foreign Application Priority Data

Dec. 17, 2009 (KR) .................. 10-2009-0126121

(51) Int. Cl.
| | |
|---|---|
| H01M 8/10 | (2006.01) |
| B01J 21/18 | (2006.01) |
| H01M 4/92 | (2006.01) |
| H01M 4/88 | (2006.01) |
| B82Y 30/00 | (2011.01) |

(52) U.S. Cl.
CPC ............ *H01M 4/921* (2013.01); *H01M 4/8842* (2013.01); *H01M 4/926* (2013.01); *H01M 2008/1095* (2013.01); *Y02E 60/523* (2013.01); *Y02E 60/50* (2013.01); *Y10S 977/734* (2013.01); *Y10S 977/742* (2013.01)
USPC ........... 429/489; 502/101; 502/183; 502/184; 977/734; 977/742

(58) Field of Classification Search
USPC ........... 429/489; 502/101, 183, 184; 977/734, 977/742
See application file for complete search history.

(56) References Cited

U.S. PATENT DOCUMENTS

| | | | |
|---|---|---|---|
| 2007/0003823 A1* | 1/2007 | Mei et al. | 429/44 |
| 2008/0014494 A1* | 1/2008 | Iordache et al. | 429/40 |
| 2011/0053039 A1* | 3/2011 | Pak et al. | 429/483 |

FOREIGN PATENT DOCUMENTS

| | | | | |
|---|---|---|---|---|
| JP | 2003-181288 | 7/2003 | | |
| JP | 2005-279596 | 10/2005 | | |
| KR | 10-2002-0092996 A | 12/2002 | | |
| KR | 10-2008-0009539 A | 1/2008 | | |
| KR | 1020080009539 A * | 1/2008 | .............. | H01M 4/86 |
| KR | 10-2008-0024706 A | 3/2008 | | |
| KR | 1020080024706 A * | 3/2008 | .............. | H01M 4/90 |
| KR | 10-2009-0052018 A | 5/2009 | | |

* cited by examiner

*Primary Examiner* — Karie O'Neill Apicella
(74) *Attorney, Agent, or Firm* — Cantor Colburn LLP (57) ABSTRACT

An electrode catalyst for a fuel cell includes a complex support including at least one metal oxide and carbon-based material; and a palladium (Pd)-based catalyst supported by the complex support. A method of manufacturing the electrode catalyst includes dissolving a precursor of a palladium (Pd)-based catalyst in a solvent and preparing a mixture solution for a catalyst; adding a complex support including at least one metal oxide and a carbon-based material to the mixture solution for a catalyst and stirring the mixture solution to which the complex support is added; drying the mixture solution for a catalyst, to which the complex support is added, in order to disperse the precursor of the Pd-based catalyst on the complex support; and reducing the precursor of the Pd-based catalyst dispersed on the complex support. A fuel cell includes the electrode catalyst.

11 Claims, 9 Drawing Sheets

ELECTRODE CATALYST FOR FUEL CELL, METHOD OF MANUFACTURING THE SAME, AND FUEL CELL USING THE ELECTRODE CATALYST

CROSS-REFERENCE TO RELATED APPLICATION

This application claims the benefit of Korean Application No. 10-2009-0126121, filed Dec. 17, 2009, in the Korean Intellectual Property Office, the disclosure of which is incorporated herein by reference.

BACKGROUND

1. Field

The present disclosure relates to fuel cells, and more particularly, to non-platinum (Pt) based electrode catalysts for fuel cells, methods of manufacturing the same, and fuel cells using the non-Pt based electrode catalysts.

2. Description of the Related Art

Fuel cells are electricity-generating cells that directly convert energy from chemical reactions between hydrogen and oxygen into electrical energy and may continuously generate electricity as long as hydrogen and oxygen is supplied, unlike general batteries. Unlike a general electricity generation method in which efficiency is lost during various processes, fuel cells may directly generate electricity and thus its efficiency is about two times higher than internal-combustion engine. Also, problems such as environmental pollution and resource depletion may be reduced.

Fuel cells may be classified into polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs), according to the types of electrolyte and fuel used in the fuel cells.

In general, PEMFCs and DMFCs include a membrane-electrode assembly (MEA) consisting of an anode, a cathode, and a polymer electrolyte membrane interposed between the anode and the cathode. An oxidation reaction involving fuel occurs in the anode, to which hydrogen or fuel is applied, hydrogen ions generated in the anode are transmitted to the cathode through the polymer electrolyte membrane, and a reduction reaction involving oxygen is generated in the cathode, to which oxygen is supplied, and thus a voltage difference occurs between the anode and the cathode, thereby generating electricity.

A catalyst that facilitates a reaction for generating hydrogen ions by oxidizing fuel is used in the anode of fuel cells and a catalyst that facilitates reduction of oxygen is used in the cathode.

In general, a catalyst using platinum (Pt) as an active component is used in the anode and the cathode. However, there are only small reserves of Pt-based catalysts and Pt-based catalysts are expensive. Thus, the cost of using a Pt-based catalyst makes up a large portion of the entire cost of manufacturing fuel cells and thus mass production and commercialization thereof are difficult. Therefore, development of a non-Pt based catalyst and studies for developing fuel cells having excellent performance by applying the non-Pt based catalyst are being performed.

SUMMARY

Provided are non-platinum (Pt) based electrode catalysts for fuel cells having excellent oxygen reduction capability, methods of manufacturing the same, and fuel cells using the non-Pt based electrode catalysts.

Additional aspects will be set forth in part in the description which follows and, in part, will be apparent from the description, or may be learned by practice of the presented embodiments.

According to an aspect of the present invention, an electrode catalyst for a fuel cell includes a complex support including at least one metal oxide and a carbon-based material; and a palladium (Pd)-based catalyst supported by the complex support.

According to another aspect of the present invention, a method of manufacturing an electrode catalyst for a fuel cell includes dissolving a precursor of a palladium (Pd)-based catalyst in a solvent and preparing a mixture solution for a catalyst; adding a complex support including at least one metal oxide and a carbon-based material to the mixture solution for a catalyst and stirring the mixture solution to which the complex support is added; drying the mixture solution for a catalyst, to which the complex support is added, in order to disperse the precursor of the Pd-based catalyst on the complex support; and reducing the precursor of the Pd-based catalyst dispersed on the complex support.

According to another aspect of the present invention, a fuel cell includes an electrode including the electrode catalyst for a fuel cell above; and an electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, one or more embodiments of the present invention will be described more fully with reference to the accompanying drawings. Aspects of the present invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1A:
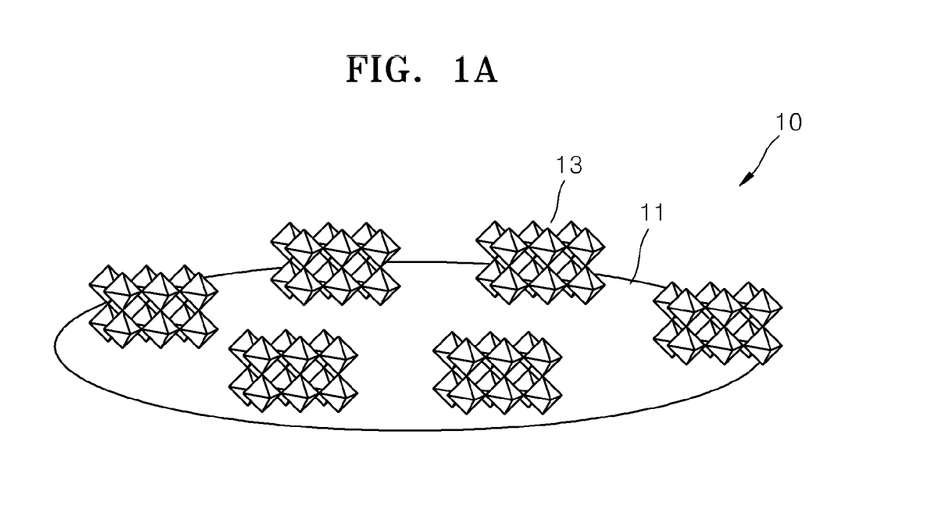
FIG. 1A is a diagram of a complex support in an electrode catalyst for a fuel cell, according to an embodiment of the present invention.
Figure 1B:
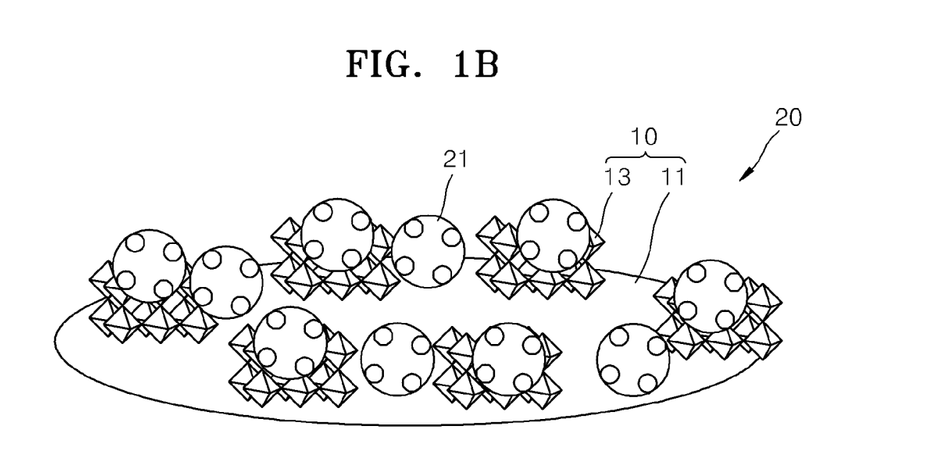
FIG. 1B is a diagram of an electrode catalyst for a fuel cell in which a palladium (Pd)-based catalyst is supported by the complex support of FIG. 1A, according to an embodiment of the present invention.

FIG. 1A is a diagram of a complex support 10 in an electrode catalyst for a fuel cell, according to an embodiment of the present invention and FIG. 1B is a diagram of an electrode catalyst 20 for a fuel cell in which a palladium (Pd)-based catalyst is supported by the complex support 10 of FIG. 1A, according to an embodiment of the present invention.

Referring to FIG. 1A, in the complex support 10, metal oxides 13 are dispersed on a material having a large surface area, for example, a carbon-based material 11.

Examples of the metal oxides 13 dispersed on the carbon-based material 11 may include at least one selected from the group consisting of titanium (Ti), boron (B), tin (Sn), indium (In), vanadium (V), tungsten (W), molybdenum (Mo), manganese (Mn), cerium (Ce), niobium (Nb), chromium (Cr), zirconium (Zr), zinc (Zn), iron (Fe), and tellurium (Te).

Referring to FIG. 1B, the electrode catalyst 20 for a fuel cell has a structure in which a palladium (Pd)-based metal catalyst 21 is supported by the complex support 10 including the metal oxides 13. The Pd-based metal catalyst 21 may be dispersed on the metal oxides 13 and the carbon-based material 11. Catalytic characteristics of the Pd-based metal catalyst 21 are improved due to an interaction (bonding) between the Pd-based metal catalyst 21 and the metal oxides 13.

The Pd-based metal catalyst 21 may be a palladium (Pd) catalyst or an alloy catalyst including palladium (Pd) and at least one selected from the group consisting of iridium (Ir), cobalt (Co), nickel (Ni), titanium (Ti), vanadium (V), chromium (Cr), zinc (Zn), manganese (Mn), copper (Cu), iron (Fe), niobium (Nb), indium(In), tin (Sn), tungsten (W), and cerium (Ce). It is to be understood that according to an aspect of the present invention, the electrode catalyst 20 including the Pd-based metal catalyst 20 does not contain any platinum (Pt).

The Pd-based metal catalyst 21 supported by the complex support 10 may be in the form of catalytic particles having an average diameter of about 2 to about 15 nm. If the diameter of the Pd-based metal catalyst 21 is less than about 2 nm, there is relatively little space for oxygen reduction activity and thus the activity may be reduced. If the diameter of the Pd-based metal catalyst 21 is greater than 15 nm, surface areas of exposed catalytic particles are reduced and thus oxygen reduction activity may be reduced and thus it is difficult to use the Pd-based metal catalyst 21 as a catalyst.

The amount of the Pd-based metal catalyst 21 may be in the range of about 1 to about 70 weight % based on 100 weight % of the electrode catalyst 20 for a fuel cell. The amount of the metal oxides 13 in the complex support 10 may be in the range of about 0.01 to about 70 weight % based on 100 weight % of the complex support 10.

The Pd-based metal catalyst 21 supported by the complex support 10 including the metal oxides 13 may have higher stability and greater catalytic characteristics than a Pd-based metal catalyst only supported by a carbon support. As a lattice size and electron density of the Pd-based metal catalyst 21 are changed due to an interaction (bonding) between the metal oxides 13 and the Pd-based metal catalyst 21, oxygen reduction characteristics of the Pd-based metal catalyst 21 are changed.

Figure 2A:
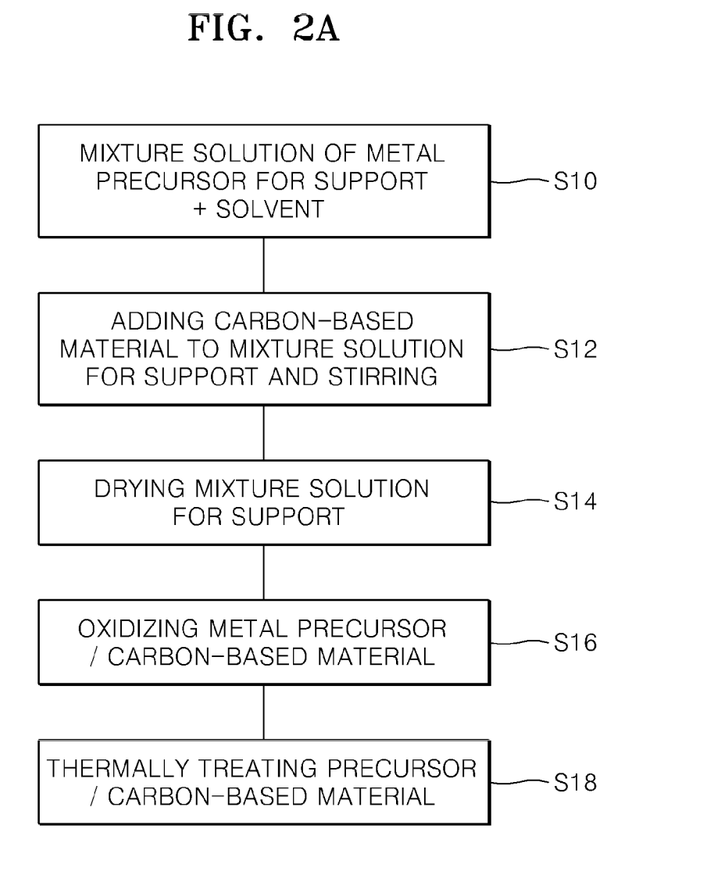
FIG. 2A is a flowchart illustrating a method of manufacturing the complex support of FIG. 1A.
Figure 2B:
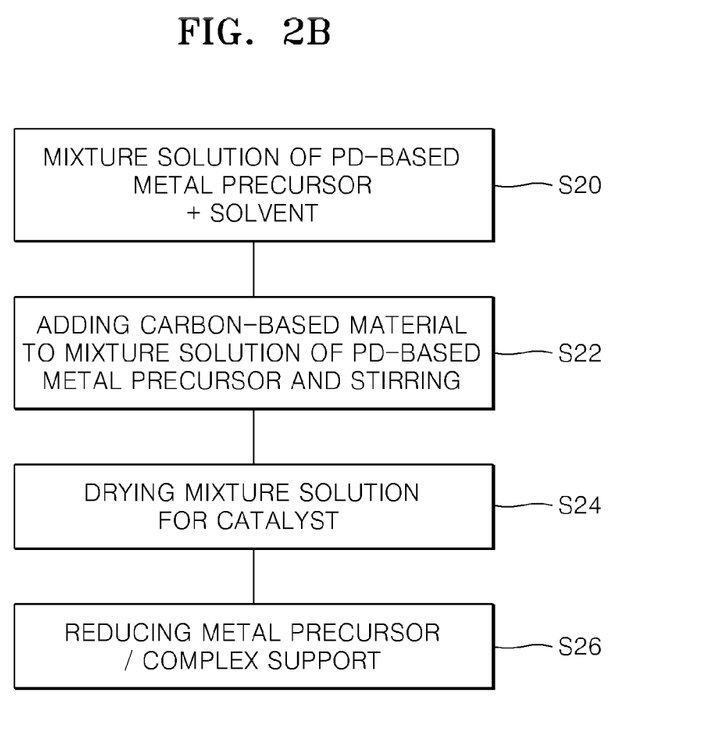
FIG. 2B is a flowchart illustrating a method of manufacturing the electrode catalyst for a fuel cell of FIG. 1B.

FIG. 2A is a flowchart illustrating a method of manufacturing the complex support 10 of FIG. 1A, and FIG. 2B is a flowchart illustrating a method of manufacturing the electrode catalyst 20 for a fuel cell of FIG. 1B.

First, the method of manufacturing the complex support 10 of the electrode catalyst 20 for a fuel cell is described with reference to FIG. 2A. A metal precursor for a complex support is dissolved in a solvent to prepare a mixture solution for a complex support, in operation S10. Examples of the metal precursor for a complex support may include at least one selected from the group consisting of titanium (Ti), boron (B), tin (Sn), indium (In), vanadium (V), tungsten (W), molybdenum (Mo), manganese (Mn), cerium (Ce), niobium (Nb), chromium (Cr), zirconium (Zr), zinc (Zn), iron (Fe), and tellurium (Te). The metal precursor may be a salt of a metal that may be dissolved in a solvent, for example, nitride, chloride, sulfide, acetate, acetylacetonate, cyanate, isopropyl oxide, or butoxide of a metal. The solvent may be, for example, distilled water, hydrochloric acid, nitric acid, acetone, ethanol, or isopropyl alcohol.

A carbon-based material for a support is put in the mixture solution and the mixture solution is stirred, in operation S12. Examples of the carbon-based material may include ketjen black, carbon black, graphite carbon, carbon nanotube, or carbon fiber.

The mixture solution, to which the carbon-based material is added, is dried, in operation S14, in order for the metal precursor for a complex support to be dispersed on the carbon-based material. For example, the mixture solution may be dried at about 50° C. by distillation under reduced pressure.

The metal precursor dispersed on the carbon-based material is oxidized to prepare a metal oxide dispersed on the carbon-based material, in operation S16. For example, the metal precursor for a complex support dispersed on the carbon-based material is thermally treated at about 300° C. in the air in order to be oxidized.

In order to improve crystallinity of the metal oxide for a complex support, the carbon-based material on which the metal oxide for a complex support is dispersed is thermally treated, in operation S18. For example, the carbon-based material on which the metal oxide for a complex support is dispersed may be thermally treated at a temperature higher than that of the oxidation heat treatment, for example, at about 450° C., under an inert atmosphere.

Then, the method of manufacturing the electrode catalyst 20 for a fuel cell is described with reference to FIG. 2B. A precursor of a Pd-based catalyst is dissolved in a solvent to prepare a mixture solution, in operation S20. The Pd-based catalyst may be a palladium (Pd) catalyst or an alloy catalyst including palladium (Pd) and at least one metal(M) selected from the group consisting of iridium (Ir), cobalt (Co), nickel (Ni), titanium (Ti), vanadium (V), chromium (Cr), zinc (Zn), manganese (Mn), copper (Cu), iron (Fe), niobium (Nb), indium(In), tin (Sn), tungsten (W), and cerium (Ce).

Examples of the precursor of the Pd-based catalyst may include palladium (III) nitride, palladium (III) chloride, palladium (III) sulfide, palladium (III) acetate, palladium (III) acetylacetonate, palladium (II) cyanate, palladium (II) isopropyl oxide, or palladium (II) butoxide. Examples of the precursor of metal M may include chloride, acetylacetonate, cyanate, acetate, sulfide, or nitride of the metal M.

The complex support manufactured according to the method illustrated in FIG. 2A is added to the mixture solution and the mixture solution is stirred, in operation S22.

The mixture solution, to which the complex support is added, is dried, in operation S24, in order for the metal precursor for a catalyst to be dispersed on the complex support. For example, the mixture solution may be dried at about 50° C. by distillation under reduced pressure.

Then, the metal precursor for a catalyst dispersed on the complex support is reduced, in operation S26. For example, the metal precursor for a catalyst dispersed on the complex support may be reduced to an alloy including palladium Pd or both palladium Pd and iridium (Ir) by being thermally treated at about 100 to about 300° C. under a reduction atmosphere such as a hydrogen atmosphere. Accordingly, an electrode catalyst for a fuel cell supported by a complex support including metal oxide may be obtained.

Figure 3:
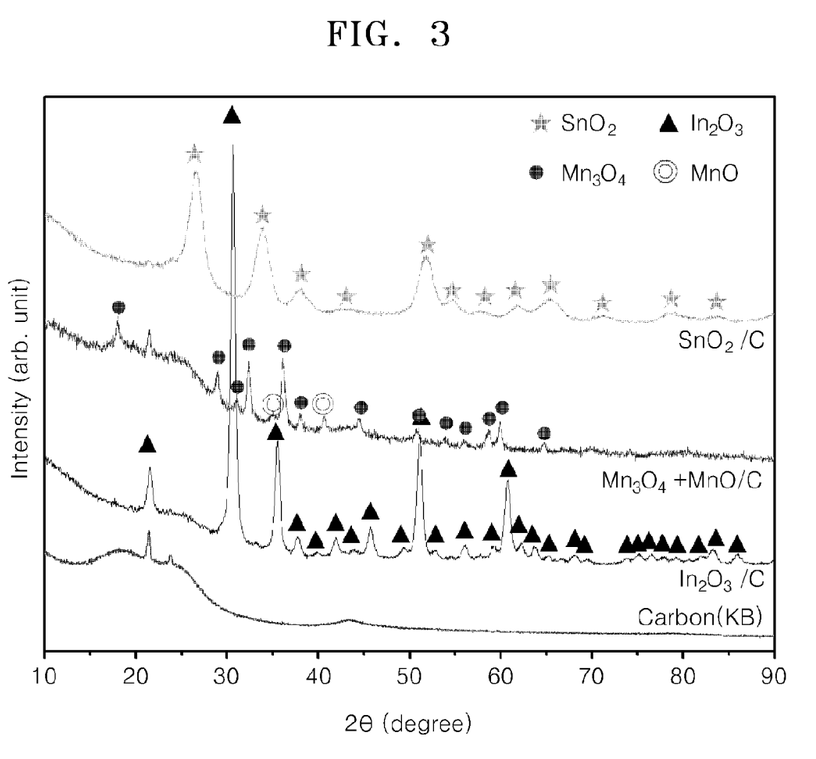
FIG. 3 is a graph showing results of X-ray diffraction (XRD) measurements for a complex support manufactured according to the method of FIG. 2A.

FIG. 3 is a graph showing results of X-ray diffraction (XRD) measurements for a complex support manufactured according to the method of FIG. 2A. Referring to FIG. 3, a graph for carbon is smooth, whereas graphs for metal oxides such as a tin oxide ($SnO_2$), an indium oxide ($In_2O_3$), and a manganese oxide ($Mn_3O_4$, MnO) have clear peaks. Thus, the metal oxides of the complex support manufactured according to the method of the present invention have crystallinity.

Figure 4:
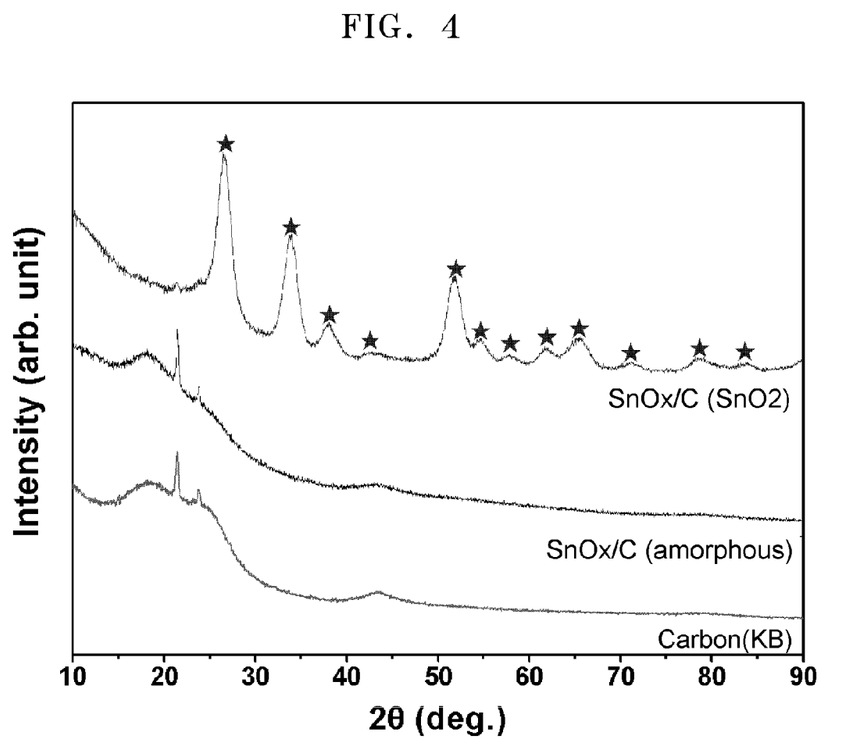
FIG. 4 is a graph showing results of XRD measurements for a crystalline tin oxide/carbon (SnOx/C) complex support and an amorphous tin oxide/carbon complex support manufactured according to the method of FIG. 2A.
Figure 5:
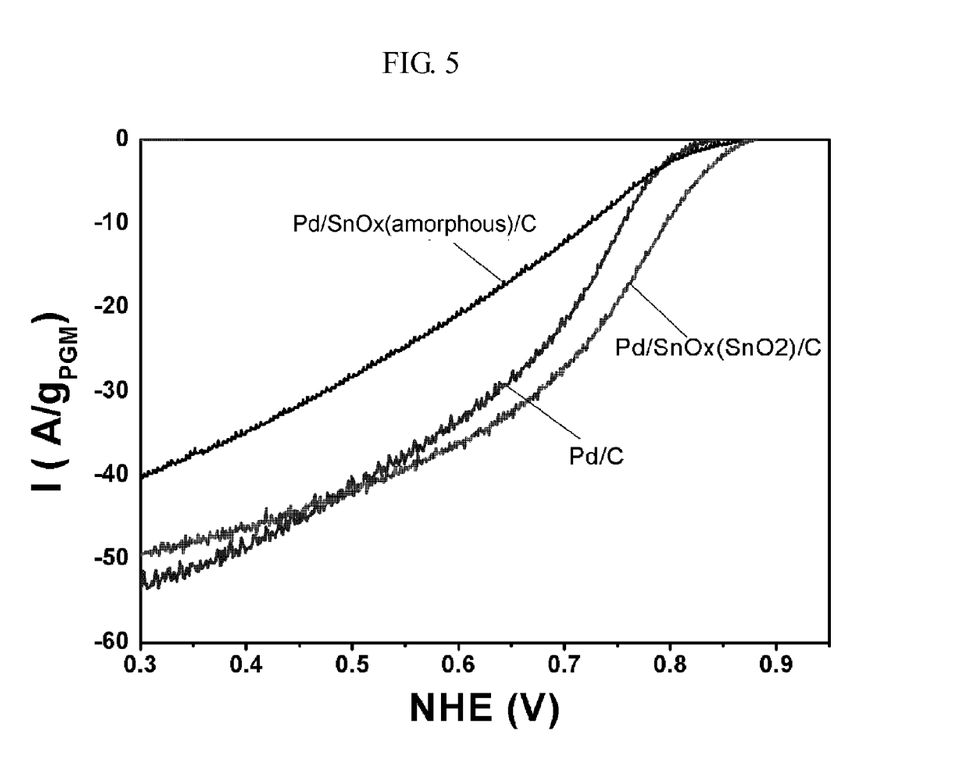
FIG. 5 is a graph showing oxygen reduction reaction (ORR) activity evaluation of a half cell using a Pd/SnO$_x$/C electrode catalyst in which palladium (Pd) is respectively supported by a crystalline tin oxide/carbon (SnO$_x$/C) complex support and an amorphous tin oxide/carbon complex support of FIG. 4.

FIG. 4 is a graph showing results of XRD measurements for a crystalline tin oxide/carbon ($SnO_x$/C) complex support and an amorphous tin oxide/carbon complex support manufactured according to the method of FIG. 2A and FIG. 5 is a graph showing oxygen reduction reaction (ORR) activity evaluation of a half cell using a Pd/$SnO_x$/C electrode catalyst in which palladium (Pd) is respectively supported by the crystalline tin oxide/carbon ($SnO_x$/C) complex support and the amorphous tin oxide/carbon complex support of FIG. 4.

Referring to FIG. 4, when a tin oxide in the tin oxide/carbon ($SnO_x$/C) complex support is in an amorphous state, an XRD peak relating to the tin oxide is not shown. In the crystalline tin oxide/carbon ($SnO_x$/C) complex support, a state of the tin oxide ($SnO_2$) may be identified from an XRD peak that corresponds to the tin oxide ($SnO_2$).

In ORR activity of the half cell using the Pd/$SnO_x$/C electrode catalyst shown in FIG. 5, an ORR initiation voltage is higher and a reduction current density for the same voltage is greater in a Pd/crystalline-tin oxide/carbon complex support than in a Pd/amorphous-tin oxide/carbon complex support. Thus, the ORR activity of the half cell using the Pd/$SnO_x$/C electrode catalyst varies according to a crystalline state of the tin oxide.

Fuel cells include an anode, a cathode, and an electrolyte membrane interposed between the anode and the cathode. In the anode, a hydrogen oxidation reaction occurs and thus hydrogen ions and electrons are generated ($H_2 \rightarrow 2H^+ + 2e^-$). The hydrogen ions $H^+$ diffuse to the cathode through the electrolyte membrane and the electrons move along an external circuit. In the cathode, the ORR occurs and thus water is generated ($2H^+ + 2e^- + \frac{1}{2}O_2 \rightarrow H_2O$). Here, hydrogen ions ($H^+$) are supplied from the electrolyte membrane and electrons are supplied from the external circuit.

The electrode catalyst for a fuel cell manufactured according to the methods illustrated in FIGS. 2A and 2B is applied to the cathode of a fuel cell in which the ORR occurs and thus a fuel cell including a cathode having excellent oxygen reduction capability may be provided. Examples of the fuel cell may include phosphoric acid fuel cells (PAFCs), polymer electrolyte membrane fuel cells (PEMFCs), and methanol fuel cells (DMFCs). Also, the electrode catalyst for a fuel cell may be applied to the anode of a fuel cell.

Figure 7:
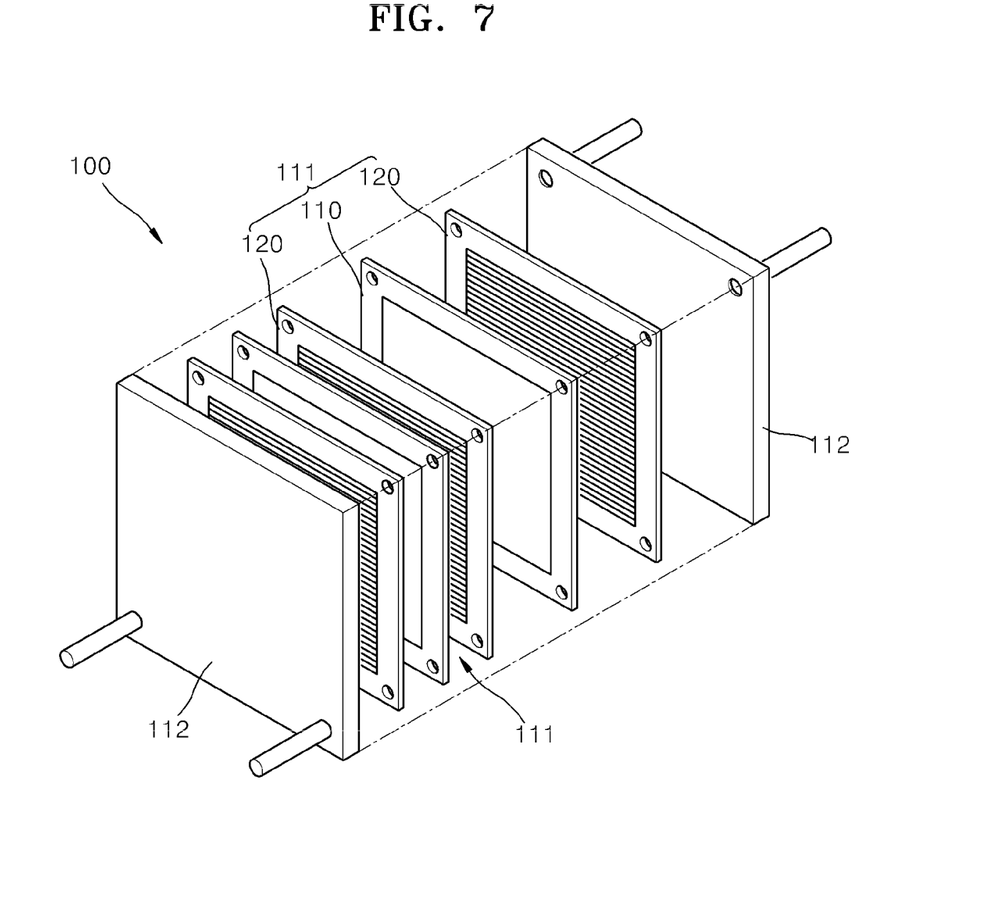
FIG. 7 is a perspective exploded view of a fuel cell according to an embodiment of the present invention.
Figure 8:
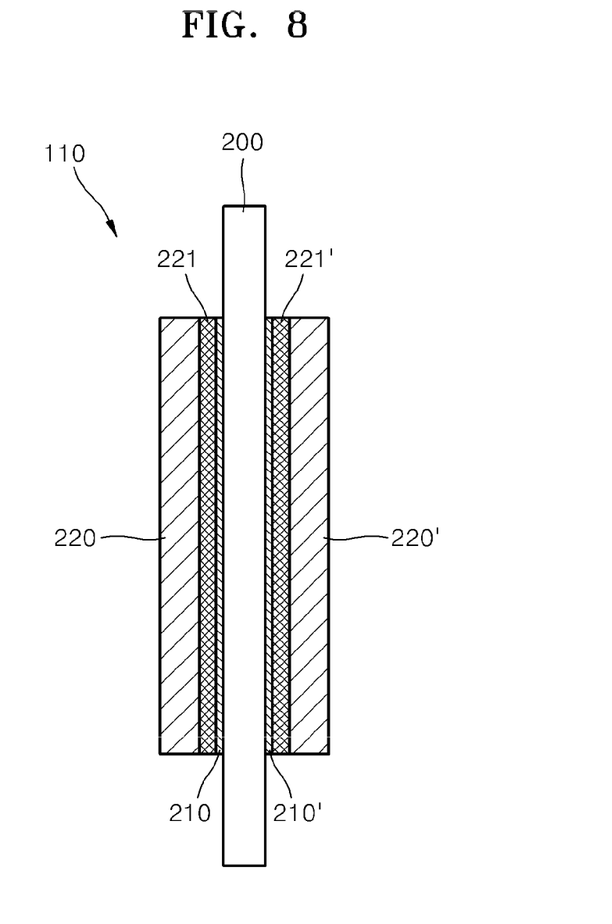
FIG. 8 is a cross-sectional diagram of a membrane-electrode assembly (MEA) that constitutes the fuel cell of FIG. 7.

FIG. 7 is a perspective exploded view of a fuel cell 100 according to an embodiment of the present invention and FIG. 8 is a cross-sectional diagram of a membrane-electrode assembly (MEA) 110 that constitutes the fuel cell 100 of FIG. 7.

In the fuel cell 100 illustrated in FIG. 7, two unit cells 111 are interposed between a pair of holders 112. Each of the unit cells 111 includes the MEA 110 and bipolar plates 120 disposed on both sides of the MEA 110 in a thickness direction of the MEA 110. The bipolar plates 120 are formed of a conductive metal, carbon, or the like, and are respectively connected to the MEAs 110 so that the bipolar plates 120 may function as current collectors and provide oxygen and fuel to catalytic layers of the MEAs 110.

In the fuel cell 100 of FIG. 7, two unit cells 111 are shown. However, the number of the unit cells 111 is not limited thereto and may be expanded to several tens to hundreds according to the required properties of the fuel cell 100.

Referring to FIG. 8, each MEA 110 includes an electrolyte membrane 200, catalytic layers 210 and 210' respectively disposed on opposite sides of the electrolyte membrane 200 in the thickness direction of the electrolyte membrane 200, first gas diffusion layers 221 and 221' respectively stacked on the catalytic layers 210 and 210', and second gas diffusion layers 220 and 220' respectively stacked on the first gas diffusion layers 221 and 221'. It is to be understood that the relative positioning of the first gas diffusion layers 221 and 221', the second gas diffusion layers 220 and 220' and the catalytic layers 210 and 210' may differ from what is shown in FIG. 8.

The catalytic layers 210 and 210' function respectively as a fuel electrode and an oxygen electrode, each including a catalyst and a binder therein, and may further include a material that may increase the electrochemical surface area of the catalyst.

The first gas diffusion layers 221 and 221' and the second gas diffusion layers 220 and 220' may each be formed of, for example, a carbon sheet or a carbon paper, and diffuse oxygen and fuel supplied through the bipolar plates 120 to entire surfaces of the catalytic layers 210 and 210'.

The fuel cell 100 including such an MEA 110 may operate at a temperature of about 100 to about 300° C. Fuel such as hydrogen is supplied through the bipolar plates 120 to one of the catalytic layers 210 and 210' and an oxidant such as oxygen is supplied through the bipolar plates 120 to the other catalytic layer. Then, hydrogen is oxidized to generate hydrogen ions $H^+$ in one catalytic layer, and the hydrogen ions $H^+$ are transmitted to the other catalytic layer through the electrolyte membrane 200. The hydrogen ions $H^+$ and oxygen are subjected to an electrochemical reaction to generate water $H_2O$ and electric energy in the other catalytic layer. Moreover, hydrogen supplied as a fuel may be hydrogen produced by reforming hydrocarbons or alcohols. Oxygen supplied as an oxidant may be supplied from the air.

Hereinafter, one or more embodiments of the present invention will be described more fully with reference to Examples and Comparative Examples below. It will be understood that Examples below are only provided for clear understanding of the embodiments of the present invention and the embodiments of the present invention are not limited to the following Examples.

Example 1

Manufacture of Pd/TiO$_x$/C Electrode Catalyst 0.78 g of isopropyl titanium oxide (Ti(OCH(CH$_3$)$_2$)$_4$) as a titanium (Ti) precursor was impregnated with 1 g of ketjen black, a carbon-based material, using incipient wetness impregnation and was calcined at 300° C. in the air, thereby oxidizing the titanium (Ti) precursor into a titanium (Ti) oxide.

Then, 0.3 g of the titanium (Ti) oxide/carbon (TiO$_x$/C) complex support manufactured as described above was added to 40 g of a mixture solution obtained by dissolving 0.76 g of a palladium nitride (Pd(NO$_3$).2H$_2$O), as a palladium (Pd) precursor, in distilled water and was stirred. The mixture solution was dried at about 50° C. by distillation under reduced pressure. Then, a dried resultant was thermally treated at a temperature of about 200° C. under a hydrogen atmosphere so that the palladium (Pd) precursor was reduced to palladium (Pd), thereby manufacturing a Pd/TiO$_x$/C electrode catalyst.

Example 2

Manufacture of Pd/SnO$_x$/C Electrode Catalyst 0.5 g of tin chloride (SnCl$_2$) as a tin (Sn) precursor was dissolved in distilled water, impregnated with 1 g of ketjen black, a carbon-based material, using incipient wetness impregnation, and then calcined at 300° C. in the air, thereby oxidizing the tin (Sn) precursor into a tin oxide. Then, in order to improve crystallinity of the tin (Sn) oxide, the tin (Sn) oxide was thermally treated at about 450° C. under a nitrogen atmosphere, thereby manufacturing a tin (Sn) oxide/carbon (SnO$_x$/C) complex support.

A Pd/SnO$_x$/C electrode catalyst, in which palladium (Pd) was supported by the tin (Sn) oxide/carbon (SnO$_x$/C) complex support, was manufactured through the same process as in the manufacturing of the Pd/TiO$_x$/C electrode catalyst, in which palladium (Pd) was supported by the titanium (Ti) oxide/carbon (TiO$_x$/C) complex support, of Example 1, except that the tin (Sn) oxide/carbon (SnO$_x$/C) complex support was used instead of the titanium (Ti) oxide/carbon (TiO$_x$/C) complex support.

Example 3

Manufacture of Pd/InO$_x$/C Electrode Catalyst 0.1 g of indium acetate ((CH$_3$CO$_2$)$_3$In.H$_2$O) as an indium (In) precursor was dissolved in distilled water, impregnated with 1 g of ketjen black, a carbon-based material, using incipient wetness impregnation, and then calcined at 300° C. in the air, thereby oxidizing the indium (In) precursor into an indium (In) oxide. Then, in order to improve crystallinity of the indium (In) oxide, the indium (In) oxide was thermally treated at about 450° C. under a nitrogen atmosphere, thereby manufacturing an indium oxide/carbon (InO$_x$/C) complex support.

A Pd/InO$_x$/C electrode catalyst, in which palladium (Pd) was supported by the indium oxide/carbon (InO$_x$/C) complex support, was manufactured through the same process as in the manufacturing of the Pd/TiO$_x$/C electrode catalyst, in which palladium (Pd) was supported by the titanium oxide/carbon (TiO$_x$/C) complex support, of Example 1, except that the indium oxide/carbon (InO$_x$/C) complex support was used instead of the titanium oxide/carbon (TiO$_x$/C) complex support.

Example 4

Manufacture of Pd/BO$_x$/C Electrode Catalyst 0.017 g of a boric acid (H$_3$BO$_3$) as a boron (B) precursor was dissolved in distilled water, impregnated with 1 g of ketjen black, a carbon-based material, using incipient wetness impregnation, and then calcined at 300° C. in the air, thereby manufacturing a boron oxide/carbon (BO$_x$/C) complex support.

A Pd/BO$_x$/C electrode catalyst, in which palladium (Pd) was supported by the boron oxide/carbon (BO$_x$/C) complex support, was manufactured through the same process as in the manufacturing of the Pd/TiO$_x$/C electrode catalyst, in which palladium (Pd) was supported by the titanium oxide/carbon (TiO$_x$/C) complex support, of Example 1, except that the boron oxide/carbon (BO$_x$/C) complex support was used instead of the titanium oxide/carbon (TiO$_x$/C) complex support.

Example 5

Manufacture of Pd/MnO$_x$/C Electrode Catalyst 0.077 g of a manganese (Mn) nitride (Mn(NO$_3$)$_2$.H$_2$O) as a manganese (Mn) precursor was dissolved in distilled water, impregnated with 1 g of ketjen black, a carbon-based material, using incipient wetness impregnation, and then calcined at 300° C. in the air, thereby oxidizing the manganese (Mn) precursor into manganese oxide (MnO$_x$). Then, the manganese oxide (MnO$_x$) was thermally treated at about 450° C. under a nitrogen atmosphere, thereby manufacturing a manganese oxide/carbon (MnO$_x$/C) complex support.

A Pd/MnO$_x$/C electrode catalyst, in which palladium (Pd) was supported by the manganese oxide/carbon (MnO$_x$/C) complex support, was manufactured through the same process as in the manufacturing of the Pd/TiO$_x$/C electrode catalyst, in which palladium (Pd) was supported by the titanium oxide/carbon (TiO$_x$/C) complex support, of Example 1, except that the manganese oxide/carbon (MnO$_x$/C) complex support was used instead of the titanium oxide/carbon (TiO$_x$/C) complex support.

Example 6

Manufacture of Pd/WO$_x$/C Electrode Catalyst 0.33 g of ammonium metatungstate ((NH$_4$)$_6$H$_2$W$_{12}$O$_{40}$.H$_2$O) as a tungsten (W) precursor was dissolved in distilled water, impregnated with 1 g of ketjen black, a carbon-based material, using incipient wetness impregnation, and then calcined at 300° C. in the air, thereby manufacturing a tungsten oxide/carbon (WO$_x$/C) complex support.

A Pd/WO$_x$/C electrode catalyst, in which palladium (Pd) was supported by the tungsten oxide/carbon (WO$_x$/C) complex support, was manufactured through the same process as in the manufacturing of the Pd/TiO$_x$/C electrode catalyst, in which palladium (Pd) was supported by the titanium oxide/carbon (TiO$_x$/C) complex support, of Example 1, except that the tungsten oxide/carbon ($WO_x/C$) complex support was used instead of the titanium oxide/carbon ($TiO_x/C$) complex support.

Comparative Example 1

Preparation of Pd/C Electrode Catalyst 0.3 g of ketjen black as a carbon-based material was added to 40 g of a mixture solution obtained by dissolving 0.76 g of a palladium nitride ($Pd(NO_3)_2.2H_2O$), as a palladium (Pd) precursor, in distilled water and was stirred. The mixture solution was dried about 50° C. by distillation under reduced pressure. Then, a dried resultant was thermally treated at temperature of about 200° C. under a hydrogen atmosphere so that the palladium (Pd) precursor was reduced to palladium (Pd), thereby manufacturing a Pd/C electrode catalyst.

Lattices and compositions of palladium (Pd) were analyzed for the electrode catalysts manufactured according to Examples 1 through 6 and Comparative Example 1 using XRD analysis and inductively coupled plasma (ICP) analysis and results are shown in Table 1 below.

TABLE 1

| | | Results | | |
|---|---|---|---|---|
| | | XRD | | ICP metal |
| Catalyst | | First peak (2θ) | Pd size (nm) | amount (wt %) |
| | | | | Pd | Metal |
| Comparative Example 1 | Pd/C | 40.17 | 14.3 | 44.05 | — |
| Example 1 | Pd/TiO$_x$/C | 40.20 | 9.9 | 44.46 | 2.15 |
| Example 2 | Pd/SnO$_x$/C | 40.08 | 9.6 | 47.18 | 6.86 |
| Example 3 | Pd/InO$_x$/C | 39.95 | 6.9 | 45.77 | 11.36 |
| Example 4 | Pd/BO$_x$/C | 40.16 | 10.9 | 40.66 | 0.03 |
| Example 5 | Pd/MnO$_x$/C | 40.22 | 14.6 | 41.20 | 5.26 |
| Example 6 | Pd/WO$_x$/C | 40.13 | 11.2 | 45.95 | 7.81 |

Referring to Table 1, palladium (Pd) in the electrode catalysts manufactured according to Examples 1 through 6 exists as reduced palladium (Pd) particles having a size in the range of about 7 to about 15 nm and the amount of palladium (Pd) particles is in the range of about 40 to about 47 weight % based on 100 weight % of the electrode catalysts. Also, the amount of the metal in the metal oxide of the complex support is in the range of about 0.03 to about 11.4 weight % based on total weight of the electrode catalysts.

The first peak in Table 1 shows the angle of diffraction of peaks corresponding to (111) plane where x-ray diffraction intensity of Pd is the greatest. As illustrated in Table 1, the angle of diffraction of the peaks corresponding to (111) plane in Examples 2 through 4 and 6 is less than the angle of diffraction of 40.17° observed in the Pd/C electrode catalyst of Comparative Example 1 and that the diffraction peak angles of Examples 1 through 6 range from about 39.95 to about 40.22°.

The angle of diffraction of the peaks corresponding to (111) plane in Examples 1 through 6 is different from the angle of diffraction of the peak corresponding to (111) plane of Comparative Example 1 due to an interaction of the surface of the metal oxide of the complex support and Pd. A lattice size of Pd is changed by the metal oxide included in the complex support and thereby characteristics such as electron density are changed so that oxygen reduction characteristics of a Pd catalyst are changed.

Evaluation of ORR Activity of Electrode Catalysts

Powder of the electrode catalyst manufactured in Examples 1 through 6 and Comparative Example 1 was mixed to a NAFION solution (NAFION perfluorinated ion-exchange resin, 5 wt % solution in a mixture of lower aliphatic alcohols and water, Aldrich) and was homogenized, thereby manufacturing catalyst slurry. The manufactured slurry was coated on a rotating disk electrode and thus an electrode for evaluating ORR activity of the catalyst was manufactured.

A three electrode cell including the rotating disk electrode, on which the catalyst slurry is coated, as a working electrode, Ag/AgCl as a reference electrode, and a Pt wire as a counter electrode was manufactured. The rotating disk electrode in the three electrode cell was rotated in 0.1 M of $HClO_4$ electrolyte solution saturated with oxygen at a speed of 900 rpm and an applied voltage was changed at a scanning speed of 5 mV/s so that a current was measured in the voltage range of open circuit voltage (OCV) to 0.3 V.

Figure 6:
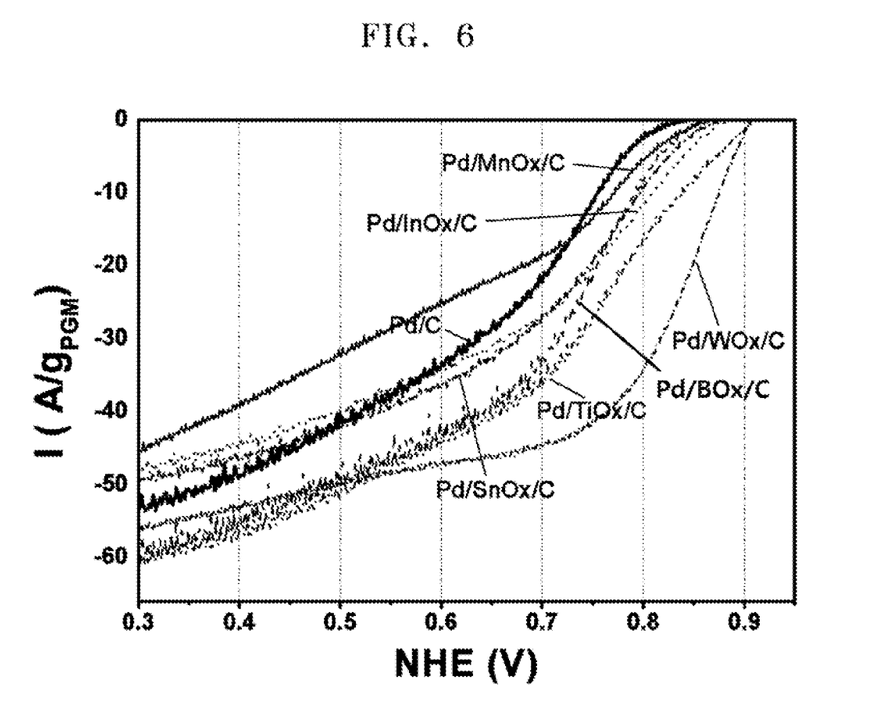
FIG. 6 is a graph showing ORR activity evaluation of electrode catalysts manufactured according to Examples 1-3, Examples 5-6, and Comparative Example 1.

FIG. 6 is a graph showing ORR activity evaluation of the electrode catalysts manufactured according to Examples 1-3, Examples 5-6, and Comparative Example 1 and Table 2 shows results of measurement of onset potential and mass activity in the ORR activity evaluation for the electrode catalysts manufactured according to Examples 1 through 6 and Comparative Example 1. The onset potential is a voltage where a current starts flowing by ORR and mass activity is a value obtained by dividing the current into mass of the catalysts. Both onset potential and mass activity can be a standard for evaluating ORR activity.

TABLE 2

| Catalyst | | Onset Potential (V vs NHE) | Mass Activity at 0.75 V (A/gpd) |
|---|---|---|---|
| Comparative Example 1 | Pd/C | 0.85 | −11.33 |
| Example 1 | Pd/TiO$_x$/C | 0.91 | −27.65 |
| Example 2 | Pd/SnO$_x$/C | 0.88 | −19.56 |
| Example 3 | Pd/InO$_x$/C | 0.89 | −20.77 |
| Example 4 | Pd/BO$_x$/C | 0.87 | −21.87 |
| Example 5 | Pd/MnO$_x$/C | 0.87 | −13.70 |
| Example 6 | Pd/WO$_x$/C | 0.91 | −41.91 |

Referring to FIG. 6 and Table 2, when the Pd/C electrode catalyst of Comparative Example 1 is used, the ORR onset potential is 0.85 V, whereas the ORR onset potentials for the Pd/metal oxide/C electrode catalysts of Examples 1 through 6 are in the range of about 0.87 to about 0.91 V. That is, the ORR onset potential is higher in the Pd/metal oxide/C electrode catalysts of Examples 1 through 6 than that of the Pd/C electrode catalyst of Comparative Example 1.

Also, as illustrated in Table 2, the mass activity of Pd at a voltage of 0.75 V is −11.33 A/g(pd) when the Pd/C electrode catalyst is used, whereas the mass activity is in the range of about −13.70 to about −41.91 A/g(pd) when the Pd/metal oxide/C electrode catalysts are used. Accordingly, reduction current density is improved when the Pd/metal oxide/C electrode catalysts according to the present invention are used, compared with a general Pd/C electrode catalyst.

In view of increases of ORR onset voltage and reduction current density, the ORR activities of Examples 1 through 6 are improved compared with the ORR activities of Comparative Example 1.

As described above, according to the one or more of the above embodiments of the present invention, the electrode catalysts according to the embodiments of the present invention includes the metal oxide and the Pd-based catalyst supported by the complex support and has excellent oxygen reduction capability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode catalyst for a fuel cell, the electrode catalyst comprising:
    a complex support comprising at least one metal oxide and a carbon-based material, wherein the metal oxide has crystallinity; and
    a palladium (Pd)-based catalyst supported by the complex support, wherein the Pd-based catalyst is a Pd catalyst or an alloy catalyst comprising at least one metal selected from the group consisting of iridium (Ir), cobalt (Co), titanium (Ti), vanadium (V), chromium (Cr), zinc (Zn), manganese (Mn), copper (Cu), niobium (Nb), Indium (In), tin (Sn), tungsten (W), and cerium (Ce), Pd.

2. The electrode catalyst of claim 1, wherein the Pd-based catalyst is disposed on the carbon-based material or the metal oxide.

3. The electrode catalyst of claim 1, wherein the Pd-based catalyst is combined with the metal oxide.

4. The electrode catalyst of claim 1, wherein the amount of the Pd-based catalyst is in the range of about 1 to about 70 parts by weight % based on 100 parts by weight % of the total sum of weights of the complex support and the Pd-based catalyst.

5. The electrode catalyst of claim 1, wherein the Pd-based catalyst has an average diameter of about 2 to about 15 nm.

6. The electrode catalyst of claim 1, wherein the metal oxide comprises at least one selected from the group consisting of titanium (Ti), boron (B), tin (Sn), indium (In), vanadium (V), tungsten (W), molybdenum (Mo), manganese (Mn), cerium (Ce), niobium (Nb), chromium (Cr), zirconium (Zr), zinc (Zn), iron (Fe), and tellurium (Te).

7. The electrode catalyst of claim 1, wherein the carbon-based material is one selected from the group consisting of ketjen black, carbon black, graphite carbon, carbon nanotube, and carbon fiber.

8. The electrode catalyst of claim 1, wherein the amount of the metal oxide is in the range of about 0.01 to about 70 weight % based on 100 weight % of the complex support.

9. A fuel cell comprising: an electrode comprising the electrode catalyst for a fuel cell of claim 1; and an electrolyte membrane.

10. The fuel cell of claim 9, wherein the electrode is a cathode.

11. The fuel cell of claim 9, wherein the electrode is an anode.

* * * * *